(12) United States Patent
Tu et al.

(10) Patent No.: US 8,615,566 B1
(45) Date of Patent: Dec. 24, 2013

(54) APPARATUS AND METHOD FOR OPERATIONAL SUPPORT OF REMOTE NETWORK SYSTEMS

(75) Inventors: Edgar Allan Tu, Castro Valley, CA (US); Eric Pang, Sunnyvale, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 417 days.

(21) Appl. No.: 09/822,810

(22) Filed: Mar. 23, 2001

(51) Int. Cl.
*G06F 15/16* (2006.01)

(52) U.S. Cl.
USPC ............ 709/219; 709/221; 709/222; 709/226

(58) Field of Classification Search
USPC ......... 709/217–219, 203, 209, 212, 216, 220, 709/221, 223, 224
See application file for complete search history.

(56) References Cited

U.S. PATENT DOCUMENTS

| | | | |
|---|---|---|---|
| 4,887,212 A | 12/1989 | Zamora et al. | 364/419 |
| 5,111,398 A | 5/1992 | Nunberg et al. | 364/419 |
| 5,115,466 A | 5/1992 | Presttun | |
| 5,130,993 A | 7/1992 | Gutman et al. | 371/42 |
| 5,146,221 A | 9/1992 | Whiting et al. | 341/67 |
| 5,204,902 A | 4/1993 | Reeds et al. | |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,425,079 A | 6/1995 | Noda et al. | |
| 5,483,352 A | 1/1996 | Fukuyama | 358/402 |
| 5,485,161 A | 1/1996 | Vaughn | 342/357.13 |
| 5,509,070 A | 4/1996 | Schull | |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |
| 5,544,061 A | 8/1996 | Morimoto et al. | 340/995 |
| 5,561,446 A | 10/1996 | Montlick | 345/173 |
| 5,574,906 A | 11/1996 | Morris | 395/601 |
| 5,579,489 A | 11/1996 | Dornier et al. | |

(Continued)

FOREIGN PATENT DOCUMENTS

| | | | |
|---|---|---|---|
| CN | 1202662 | 12/1998 | G06F 17/30 |
| CN | 1455522 | 11/2003 | H04Q 7/38 |

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner* — Barbara Burgess
(74) *Attorney, Agent, or Firm* — Haverstock & Owens LLP

(57) ABSTRACT

A method for operational support for remote network systems which allows for the rapid replacement of one server with another, in such instances as server malfunctions, routine maintenance, or upgrades. The method generally comprises providing a program storage device containing a machine identifier associated with a first, original server, transferring the program storage device and machine identifier to a second, spare server, and remotely configuring the second, spare server, according to the program storage device and machine identifier associated with the first, original server, such that the second, spare server becomes an identical replacement for the first, original server. Thus, if the first, original server malfunctions, the spare or replacement server can be remotely configured to replace the original server according to the information in the machine identifier stored on the program storage device.

21 Claims, 5 Drawing Sheets

(56) References Cited

U.S. PATENT DOCUMENTS

| | | | | |
|---|---|---|---|---|
| 5,588,009 | A | 12/1996 | Will | 371/33 |
| 5,592,470 | A | 1/1997 | Rudrapatna et al. | |
| 5,623,406 | A | 4/1997 | Ichbiah | 364/999.999 |
| 5,623,661 | A | 4/1997 | Hon | 395/601 |
| 5,628,005 | A | 5/1997 | Hurvig | 395/608 |
| 5,630,081 | A | 5/1997 | Rybicki et al. | 395/348 |
| 5,638,508 | A | 6/1997 | Kanai et al. | 714/20 |
| 5,640,577 | A | 6/1997 | Scharmer | 395/765 |
| 5,644,709 | A | 7/1997 | Austin | |
| 5,647,002 | A | 7/1997 | Brunson | 380/49 |
| 5,649,195 | A | 7/1997 | Scott et al. | 395/617 |
| 5,650,800 | A | 7/1997 | Benson | |
| 5,657,372 | A | 8/1997 | Ahlberg | |
| 5,666,397 | A | 9/1997 | Lamons et al. | |
| 5,666,553 | A | 9/1997 | Crozier | 395/803 |
| 5,682,524 | A | 10/1997 | Freund et al. | 395/605 |
| 5,684,990 | A | 11/1997 | Boothby | 395/619 |
| 5,694,596 | A | 12/1997 | Campbell | 395/610 |
| 5,699,255 | A | 12/1997 | Ellis et al. | 701/212 |
| 5,701,423 | A | 12/1997 | Crozier | 395/335 |
| 5,706,509 | A | 1/1998 | Man-Hak Tso | 395/617 |
| 5,710,922 | A | 1/1998 | Alley et al. | 395/617 |
| 5,727,202 | A | 3/1998 | Kucala | 395/610 |
| 5,727,950 | A | 3/1998 | Cook et al. | 434/350 |
| 5,729,735 | A | 3/1998 | Meyering | 395/610 |
| 5,729,739 | A | 3/1998 | Cantin et al. | 395/614 |
| 5,729,743 | A | 3/1998 | Squibb | 395/619 |
| 5,742,792 | A | 4/1998 | Yanai et al. | 395/489 |
| 5,745,750 | A | 4/1998 | Porcaro | 707/102 |
| 5,745,906 | A | 4/1998 | Squibb | 707/203 |
| 5,757,920 | A | 5/1998 | Misra et al. | 380/25 |
| 5,758,150 | A | 5/1998 | Bell et al. | 395/610 |
| 5,758,355 | A | 5/1998 | Buchanan | 707/201 |
| 5,764,899 | A | 6/1998 | Eggleston et al. | 709/203 |
| 5,768,480 | A | 6/1998 | Crawford, Jr. et al. | |
| 5,768,597 | A | 6/1998 | Simm | 395/712 |
| 5,771,354 | A | 6/1998 | Crawford | 395/200.59 |
| 5,778,346 | A | 7/1998 | Frid-Nielsen et al. | 705/9 |
| 5,778,361 | A | 7/1998 | Nanjo et al. | 707/500 |
| 5,778,367 | A | 7/1998 | Wesinger et al. | 395/10 |
| 5,778,388 | A | 7/1998 | Kawamura et al. | 707/203 |
| 5,781,901 | A | 7/1998 | Kuzma | 707/10 |
| 5,787,247 | A | 7/1998 | Norin et al. | 395/200.5 |
| 5,787,262 | A | 7/1998 | Shakib et al. | 395/200.35 |
| 5,794,228 | A | 8/1998 | French et al. | 707/2 |
| 5,804,803 | A | 9/1998 | Cragun et al. | 235/375 |
| 5,809,497 | A | 9/1998 | Freund et al. | 707/2 |
| 5,812,773 | A | 9/1998 | Norin | 395/200.34 |
| 5,812,793 | A | 9/1998 | Shakib et al. | 395/200.31 |
| 5,818,437 | A | 10/1998 | Grover et al. | 345/811 |
| 5,826,245 | A | 10/1998 | Sandberg-Diment | 705/44 |
| 5,828,376 | A | 10/1998 | Solimene et al. | |
| 5,832,489 | A | 11/1998 | Kucala | 707/10 |
| 5,832,518 | A | 11/1998 | Mastors | 707/202 |
| 5,832,519 | A | 11/1998 | Bowen et al. | 707/203 |
| 5,832,520 | A | 11/1998 | Miller | |
| 5,845,283 | A | 12/1998 | Williams et al. | 707/101 |
| 5,859,973 | A | 1/1999 | Carpenter | 395/200.33 |
| 5,864,864 | A | 1/1999 | Lerner | 707/102 |
| 5,875,296 | A | 2/1999 | Shi et al. | 395/188.01 |
| 5,884,323 | A | 3/1999 | Hawkins et al. | 707/201 |
| 5,884,325 | A | 3/1999 | Bauer et al. | 707/201 |
| 5,893,119 | A | 4/1999 | Squibb | 707/203 |
| 5,896,321 | A | 4/1999 | Miller | 365/189.01 |
| 5,897,640 | A | 4/1999 | Veghte et al. | 707/202 |
| 5,897,642 | A | 4/1999 | Capossela et al. | 707/203 |
| 5,903,723 | A | 5/1999 | Beck et al. | 709/203 |
| 5,907,793 | A | 5/1999 | Reams | 455/3.1 |
| 5,909,568 | A | 6/1999 | Nason | |
| 5,923,756 | A | 7/1999 | Shambroom | 713/156 |
| 5,923,848 | A | 7/1999 | Goodhand et al. | 395/200.49 |
| 5,926,816 | A | 7/1999 | Bauer et al. | 707/8 |
| 5,933,653 | A * | 8/1999 | Ofek | 710/6 |
| 5,933,778 | A | 8/1999 | Buhrmann et al. | |
| 5,933,816 | A | 8/1999 | Zeanah et al. | 705/35 |
| 5,935,262 | A | 8/1999 | Barrett et al. | 714/46 |
| 5,937,405 | A | 8/1999 | Campbell | 707/10 |
| 5,941,944 | A | 8/1999 | Messerly | 709/203 |
| 5,943,676 | A | 8/1999 | Boothby | 707/201 |
| 5,944,787 | A | 8/1999 | Zoken | 709/206 |
| 5,946,615 | A | 8/1999 | Holmes et al. | 455/412 |
| 5,948,066 | A | 9/1999 | Whalen et al. | 709/229 |
| 5,950,193 | A | 9/1999 | Kulkarni | |
| 5,951,636 | A | 9/1999 | Zerber | 709/202 |
| 5,961,572 | A | 10/1999 | Craport et al. | 340/990 |
| 5,961,590 | A | 10/1999 | Mendez et al. | 709/206 |
| 5,966,717 | A | 10/1999 | Sass | |
| 5,968,131 | A | 10/1999 | Mendez et al. | 709/246 |
| 5,970,149 | A | 10/1999 | Johnson | 714/46 |
| 5,970,490 | A | 10/1999 | Morgenstern | 707/10 |
| 5,971,277 | A | 10/1999 | Cragun et al. | 235/462.01 |
| 5,974,238 | A | 10/1999 | Chase, Jr. | 395/200.78 |
| 5,974,563 | A | 10/1999 | Beeler, Jr. | 714/5 |
| 5,987,381 | A | 11/1999 | Oshizawa | 340/990 |
| 5,987,609 | A | 11/1999 | Hasebe | 726/35 |
| 5,995,118 | A | 11/1999 | Masuda | 345/467 |
| 6,000,000 | A | 12/1999 | Hawkins et al. | 707/201 |
| 6,006,215 | A | 12/1999 | Retallick | 707/2 |
| 6,006,274 | A | 12/1999 | Hawkins et al. | 709/248 |
| 6,009,462 | A | 12/1999 | Birrell et al. | 709/206 |
| 6,012,063 | A | 1/2000 | Bodnar | 707/101 |
| 6,012,088 | A | 1/2000 | Li et al. | 709/219 |
| 6,014,695 | A * | 1/2000 | Yamashita et al. | 709/219 |
| 6,016,394 | A | 1/2000 | Walker | 717/104 |
| 6,016,478 | A | 1/2000 | Zhang et al. | 705/9 |
| 6,023,620 | A | 2/2000 | Hansson | |
| 6,023,708 | A | 2/2000 | Mendez et al. | 707/203 |
| 6,023,723 | A | 2/2000 | McCormick et al. | 709/206 |
| 6,026,414 | A * | 2/2000 | Anglin | 707/204 |
| 6,034,621 | A | 3/2000 | Kaufman | 340/825.44 |
| 6,038,665 | A | 3/2000 | Bolt et al. | 713/176 |
| 6,044,381 | A | 3/2000 | Boothby et al. | 707/201 |
| 6,049,776 | A * | 4/2000 | Donnelly et al. | 705/8 |
| 6,052,735 | A | 4/2000 | Ulrich et al. | 709/236 |
| 6,058,399 | A | 5/2000 | Morag et al. | 707/201 |
| 6,061,790 | A | 5/2000 | Bodnar | 713/171 |
| 6,061,796 | A | 5/2000 | Chen et al. | 713/201 |
| 6,063,134 | A | 5/2000 | Peters et al. | |
| 6,064,880 | A | 5/2000 | Alanara | 455/419 |
| 6,065,018 | A | 5/2000 | Beier et al. | 707/202 |
| 6,067,582 | A | 5/2000 | Smith et al. | |
| 6,073,133 | A | 6/2000 | Chrabaszcz | 707/10 |
| 6,076,109 | A | 6/2000 | Kikinis | 709/228 |
| 6,078,960 | A | 6/2000 | Ballard | 709/229 |
| 6,081,900 | A | 6/2000 | Subramaniam et al. | 713/201 |
| 6,094,618 | A | 7/2000 | Harada | 701/207 |
| 6,101,480 | A | 8/2000 | Conmy et al. | 705/9 |
| 6,108,330 | A | 8/2000 | Bhatia et al. | 370/352 |
| 6,108,703 | A | 8/2000 | Leighton et al. | 709/226 |
| 6,112,024 | A | 8/2000 | Almond et al. | |
| 6,115,797 | A | 9/2000 | Kanda et al. | |
| 6,131,096 | A | 10/2000 | Ng et al. | 707/10 |
| 6,131,116 | A | 10/2000 | Riggins et al. | 709/219 |
| 6,141,011 | A | 10/2000 | Bodnar et al. | 345/357 |
| 6,141,621 | A | 10/2000 | Piwowarski et al. | 340/989 |
| 6,141,659 | A | 10/2000 | Barker et al. | 707/102 |
| 6,141,664 | A | 10/2000 | Boothby | 707/201 |
| 6,145,088 | A | 11/2000 | Stevens | |
| 6,148,260 | A | 11/2000 | Musk et al. | 701/200 |
| 6,151,606 | A | 11/2000 | Mendez | 707/201 |
| 6,157,630 | A | 12/2000 | Adler et al. | 370/310 |
| 6,163,773 | A | 12/2000 | Kishi | 706/16 |
| 6,163,779 | A | 12/2000 | Mantha et al. | 707/100 |
| 6,163,844 | A | 12/2000 | Duncan et al. | 713/201 |
| 6,167,120 | A | 12/2000 | Kikinis | 379/90.01 |
| 6,173,310 | B1 | 1/2001 | Yost et al. | 709/201 |
| 6,173,311 | B1 * | 1/2001 | Hassett et al. | 709/202 |
| 6,182,117 | B1 | 1/2001 | Christie et al. | 709/205 |
| 6,182,141 | B1 | 1/2001 | Blum et al. | 709/227 |
| 6,185,598 | B1 | 2/2001 | Farber et al. | 709/200 |
| 6,189,030 | B1 | 2/2001 | Kirsch et al. | 709/224 |
| 6,189,096 | B1 | 2/2001 | Haverty | 713/155 |
| 6,195,695 | B1 * | 2/2001 | Cheston et al. | 709/221 |
| 6,195,794 | B1 | 2/2001 | Buxton | 717/11 |

(56) References Cited

U.S. PATENT DOCUMENTS

| | | | |
|---|---|---|---|
| 6,202,085 B1 | 3/2001 | Benson et al. | 709/205 |
| 6,205,448 B1 | 3/2001 | Kruglikov et al. | 707/200 |
| 6,209,034 B1 | 3/2001 | Gladwin et al. | |
| 6,212,529 B1 | 4/2001 | Boothby et al. | 707/201 |
| 6,212,556 B1 | 4/2001 | Arunachalam | |
| 6,216,131 B1 | 4/2001 | Liu et al. | 707/102 |
| 6,219,680 B1 | 4/2001 | Bernardo et al. | 707/501 |
| 6,219,694 B1 | 4/2001 | Lazaridis et al. | 709/206 |
| 6,223,187 B1 | 4/2001 | Boothby et al. | 707/201 |
| 6,226,650 B1 | 5/2001 | Mahajan et al. | 707/201 |
| 6,233,565 B1 | 5/2001 | Lewis et al. | 705/35 |
| 6,233,589 B1 | 5/2001 | Balcha et al. | 707/203 |
| 6,243,760 B1 | 6/2001 | Armbruster et al. | 709/243 |
| 6,246,889 B1 | 6/2001 | Boltz | |
| 6,247,048 B1 | 6/2001 | Greer et al. | 709/219 |
| 6,247,135 B1 | 6/2001 | Feague | 713/400 |
| 6,249,690 B1 | 6/2001 | Mashiko | |
| 6,252,547 B1 | 6/2001 | Perry et al. | 342/357.06 |
| 6,255,989 B1 | 7/2001 | Munson et al. | 342/357.13 |
| 6,256,750 B1 * | 7/2001 | Takeda | 714/11 |
| 6,260,124 B1 | 7/2001 | Crockett et al. | 711/162 |
| 6,272,545 B1 | 8/2001 | Flanagin et al. | 709/228 |
| 6,275,831 B1 | 8/2001 | Bodnar et al. | 707/201 |
| 6,278,941 B1 | 8/2001 | Yokoyama | 701/209 |
| 6,282,435 B1 | 8/2001 | Wagner et al. | 455/566 |
| 6,282,698 B1 | 8/2001 | Baker et al. | 717/1 |
| 6,285,889 B1 | 9/2001 | Nykanen et al. | 455/557 |
| 6,286,029 B1 | 9/2001 | Delph | |
| 6,286,053 B1 | 9/2001 | Van Peursem et al. | 709/999.999 |
| 6,286,085 B1 | 9/2001 | Jouenne et al. | 711/162 |
| 6,289,212 B1 | 9/2001 | Stein et al. | |
| 6,292,743 B1 | 9/2001 | Pu et al. | 455/456 |
| 6,292,905 B1 * | 9/2001 | Wallach et al. | 714/4 |
| 6,295,502 B1 | 9/2001 | Hancock et al. | 701/201 |
| 6,295,541 B1 | 9/2001 | Bodnar et al. | 707/203 |
| 6,304,881 B1 | 10/2001 | Halim et al. | 707/201 |
| 6,317,755 B1 | 11/2001 | Rakers et al. | |
| 6,321,236 B1 | 11/2001 | Zollinger et al. | 707/201 |
| 6,324,467 B1 | 11/2001 | Machii et al. | 701/200 |
| 6,324,526 B1 | 11/2001 | D'Agostino | 705/44 |
| 6,324,544 B1 | 11/2001 | Alam et al. | 707/201 |
| 6,327,533 B1 | 12/2001 | Chou | 340/988 |
| 6,329,680 B1 | 12/2001 | Yoshida et al. | 257/296 |
| 6,330,568 B1 | 12/2001 | Boothby et al. | 707/201 |
| 6,332,158 B1 | 12/2001 | Risley et al. | 709/219 |
| 6,333,973 B1 | 12/2001 | Smith et al. | 379/88.12 |
| 6,338,096 B1 | 1/2002 | Ukelson | 719/319 |
| 6,339,710 B1 | 1/2002 | Suzuki | 455/458 |
| 6,341,316 B1 | 1/2002 | Kloba et al. | 709/248 |
| 6,345,308 B1 | 2/2002 | Abe | 709/248 |
| 6,349,336 B1 | 2/2002 | Sit et al. | |
| 6,353,448 B1 | 3/2002 | Scarborough et al. | 345/349 |
| 6,356,910 B1 | 3/2002 | Zellweger | 707/100 |
| 6,356,961 B1 | 3/2002 | Oprescu-Surcobe | |
| 6,360,252 B1 | 3/2002 | Rudy et al. | 709/206 |
| 6,360,330 B1 * | 3/2002 | Mutalik et al. | 714/4 |
| 6,363,249 B1 | 3/2002 | Nordeman et al. | 455/418 |
| 6,363,412 B1 | 3/2002 | Niwa et al. | 709/203 |
| 6,374,250 B2 | 4/2002 | Ajtai et al. | 707/101 |
| 6,381,700 B1 * | 4/2002 | Yoshida | 726/4 |
| 6,389,462 B1 | 5/2002 | Cohen et al. | 709/218 |
| 6,396,482 B1 | 5/2002 | Griffin et al. | 345/169 |
| 6,397,307 B2 | 5/2002 | Ohran | 711/161 |
| 6,397,351 B1 | 5/2002 | Miller et al. | 714/13 |
| 6,401,104 B1 | 6/2002 | LaRue et al. | 707/203 |
| 6,405,218 B1 | 6/2002 | Boothby | 707/201 |
| 6,418,309 B1 | 7/2002 | Moon et al. | 455/418 |
| 6,430,289 B1 | 8/2002 | Liffick | |
| 6,434,627 B1 | 8/2002 | Millet et al. | 709/245 |
| 6,437,818 B1 | 8/2002 | Ludwig et al. | 348/14.09 |
| 6,449,622 B1 | 9/2002 | LaRue et al. | 707/201 |
| 6,453,392 B1 * | 9/2002 | Flynn, Jr. | 711/151 |
| 6,457,062 B1 | 9/2002 | Pivowar et al. | 709/248 |
| 6,460,036 B1 | 10/2002 | Herz | 707/10 |
| 6,462,644 B1 | 10/2002 | Howell et al. | |
| 6,463,464 B1 | 10/2002 | Lazaridis et al. | 709/207 |
| 6,466,967 B2 | 10/2002 | Landsman et al. | 709/203 |
| 6,473,621 B1 | 10/2002 | Heie | 455/466 |
| 6,480,896 B1 | 11/2002 | Brown et al. | 709/231 |
| 6,484,143 B1 | 11/2002 | Swildens et al. | 705/1 |
| 6,487,560 B1 | 11/2002 | LaRue et al. | 707/203 |
| 6,490,655 B1 | 12/2002 | Kershaw | 711/151 |
| 6,496,944 B1 | 12/2002 | Hsiao et al. | 714/15 |
| 6,499,108 B1 | 12/2002 | Johnson | 713/201 |
| 6,505,216 B1 | 1/2003 | Schutzman et al. | |
| 6,507,891 B1 | 1/2003 | Challenger et al. | 711/122 |
| 6,516,314 B1 | 2/2003 | Birkler et al. | |
| 6,516,327 B1 | 2/2003 | Zondervan et al. | 707/200 |
| 6,519,452 B1 | 2/2003 | Agostino et al. | |
| 6,523,063 B1 | 2/2003 | Miller et al. | 709/206 |
| 6,523,079 B2 | 2/2003 | Kikinis et al. | 710/303 |
| 6,532,588 B1 | 3/2003 | Porter | |
| 6,535,743 B1 | 3/2003 | Kennedy et al. | 455/456.1 |
| 6,535,949 B1 | 3/2003 | Parker | |
| 6,539,494 B1 * | 3/2003 | Abramson et al. | 714/4.3 |
| 6,542,933 B1 | 4/2003 | Durst, Jr. et al. | 709/229 |
| 6,546,425 B1 | 4/2003 | Hanson et al. | 709/227 |
| 6,549,933 B1 | 4/2003 | Barrett et al. | 709/203 |
| 6,549,937 B1 | 4/2003 | Auerbach et al. | |
| 6,553,375 B1 | 4/2003 | Huang et al. | 707/10 |
| 6,553,410 B2 | 4/2003 | Kikinis | 709/218 |
| 6,553,413 B1 | 4/2003 | Leighton et al. | 709/219 |
| 6,564,336 B1 * | 5/2003 | Majkowski | 714/4.1 |
| 6,567,850 B1 | 5/2003 | Freishtat et al. | 709/224 |
| 6,567,857 B1 | 5/2003 | Gupta et al. | |
| 6,581,065 B1 | 6/2003 | Rodkin et al. | 707/102 |
| 6,584,454 B1 | 6/2003 | Hummel et al. | 705/59 |
| 6,589,290 B1 | 7/2003 | Maxwell et al. | 707/507 |
| 6,591,266 B1 | 7/2003 | Li et al. | 707/10 |
| 6,591,306 B1 | 7/2003 | Redlich | 709/245 |
| 6,591,362 B1 * | 7/2003 | Li | 713/1 |
| 6,597,700 B2 | 7/2003 | Golikeri et al. | 370/401 |
| 6,601,071 B1 | 7/2003 | Bowker et al. | |
| 6,601,143 B1 | 7/2003 | Lamparter | |
| 6,609,005 B1 | 8/2003 | Chern | 455/457 |
| 6,628,194 B1 | 9/2003 | Hellebust et al. | |
| 6,636,894 B1 | 10/2003 | Short et al. | 709/225 |
| 6,640,302 B1 | 10/2003 | Subramaniam et al. | 713/169 |
| 6,643,707 B1 | 11/2003 | Booth | 709/245 |
| 6,647,399 B2 | 11/2003 | Zaremba | |
| 6,654,746 B1 | 11/2003 | Wong et al. | 707/10 |
| 6,662,212 B1 | 12/2003 | Chandhok et al. | |
| 6,665,721 B1 | 12/2003 | Hind et al. | |
| 6,668,254 B2 | 12/2003 | Matson et al. | |
| 6,671,724 B1 | 12/2003 | Pandya et al. | 709/226 |
| 6,671,757 B1 | 12/2003 | Multer et al. | 710/100 |
| 6,684,088 B1 | 1/2004 | Halahmi | |
| 6,684,206 B2 | 1/2004 | Chen et al. | 706/61 |
| 6,684,302 B2 | 1/2004 | Kershaw | 711/151 |
| 6,694,335 B1 | 2/2004 | Hopmann et al. | 707/200 |
| 6,694,336 B1 | 2/2004 | Multer et al. | 707/100 |
| 6,701,316 B1 | 3/2004 | Li et al. | 707/10 |
| 6,704,849 B2 * | 3/2004 | Steegmans | 711/162 |
| 6,714,987 B1 | 3/2004 | Amin et al. | 709/249 |
| 6,718,336 B1 | 4/2004 | Saffer et al. | |
| 6,718,348 B1 | 4/2004 | Novak et al. | 707/201 |
| 6,718,390 B1 | 4/2004 | Still et al. | 709/229 |
| 6,725,239 B2 | 4/2004 | Sherman et al. | 707/201 |
| 6,728,530 B1 | 4/2004 | Heinonen et al. | 455/414.1 |
| 6,732,101 B1 | 5/2004 | Cook | 707/10 |
| 6,732,264 B1 * | 5/2004 | Sun et al. | 713/2 |
| 6,738,789 B2 | 5/2004 | Multer et al. | 707/201 |
| 6,741,851 B1 | 5/2004 | Lee et al. | |
| 6,745,040 B2 | 6/2004 | Zimmerman | 455/458 |
| 6,757,696 B2 | 6/2004 | Multer et al. | 707/201 |
| 6,757,698 B2 | 6/2004 | McBride et al. | 707/204 |
| 6,757,712 B1 | 6/2004 | Bastian et al. | 709/206 |
| 6,781,575 B1 | 8/2004 | Hawkins et al. | 345/173 |
| 6,795,848 B1 | 9/2004 | Border et al. | 709/213 |
| 6,799,214 B1 | 9/2004 | Li | 709/226 |
| 6,804,690 B1 | 10/2004 | Dysert et al. | 707/204 |
| 6,804,783 B1 | 10/2004 | Wesinger, Jr. et al. | 713/200 |
| 6,810,411 B1 | 10/2004 | Coughlin et al. | |
| 6,812,961 B1 | 11/2004 | Parulski et al. | 348/231.2 |

(56) References Cited

U.S. PATENT DOCUMENTS

| | | | |
|---|---|---|---|
| 6,813,487 B1 | 11/2004 | Trommelen | |
| 6,816,481 B1 | 11/2004 | Adams et al. | 370/352 |
| 6,829,654 B1 | 12/2004 | Jungck | |
| 6,836,657 B2 | 12/2004 | Ji et al. | |
| 6,836,765 B1 | 12/2004 | Sussman | 705/41 |
| 6,839,022 B1 | 1/2005 | Benco et al. | |
| 6,839,568 B2 | 1/2005 | Suzuki | |
| 6,842,695 B1 | 1/2005 | Tu | 701/213 |
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 | 4/2005 | Beranek | 707/10 |
| 6,892,225 B1 | 5/2005 | Tu et al. | 709/217 |
| 6,892,245 B1 | 5/2005 | Crump et al. | 709/245 |
| 6,904,449 B1 | 6/2005 | Quinones | |
| 6,904,460 B1 | 6/2005 | Raciborski et al. | 709/224 |
| 6,920,488 B1 | 7/2005 | Le Pennec et al. | 709/219 |
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/217 |
| 6,944,676 B1 | 9/2005 | Armbruster et al. | 709/243 |
| 6,954,660 B2 | 10/2005 | Aoyama | |
| 6,954,783 B1 | 10/2005 | Bodwell et al. | 709/218 |
| 6,959,331 B1 * | 10/2005 | Traversat et al. | 709/222 |
| 6,963,914 B1 | 11/2005 | Breitbart et al. | 709/226 |
| 6,973,299 B2 | 12/2005 | Apfel | |
| 6,996,617 B1 | 2/2006 | Aiken, Jr. et al. | |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/201 |
| 7,010,578 B1 | 3/2006 | Lewin et al. | |
| 7,016,964 B1 | 3/2006 | Still et al. | |
| 7,023,868 B2 | 4/2006 | Rabenko et al. | 370/419 |
| 7,030,730 B1 | 4/2006 | Zondervan | |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | |
| 7,082,476 B1 | 7/2006 | Cohen et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,107,043 B2 | 9/2006 | Aoyama | |
| 7,110,954 B2 | 9/2006 | Yung et al. | |
| 7,116,681 B1 | 10/2006 | Hovell et al. | 370/466 |
| 7,146,161 B2 | 12/2006 | Chou | |
| 7,158,805 B1 | 1/2007 | Park et al. | |
| 7,159,036 B2 | 1/2007 | Hinchliffe et al. | |
| 7,162,494 B2 | 1/2007 | Arellano | 707/104.1 |
| 7,167,728 B1 | 1/2007 | Wagner et al. | 455/566 |
| 7,181,628 B2 | 2/2007 | Sato et al. | |
| 7,197,574 B1 | 3/2007 | Ishiyama | 709/245 |
| 7,233,791 B2 | 6/2007 | Gilbert et al. | 455/419 |
| 7,237,027 B1 * | 6/2007 | Raccah et al. | 709/226 |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,308,651 B2 | 12/2007 | Kling et al. | |
| 7,315,826 B1 | 1/2008 | Guheen et al. | 705/7 |
| 7,317,907 B2 | 1/2008 | Linkert et al. | |
| 7,328,341 B1 | 2/2008 | Eun et al. | |
| 7,343,568 B2 | 3/2008 | Jiang et al. | |
| 7,349,719 B2 | 3/2008 | Buniatyan | |
| 7,356,559 B1 | 4/2008 | Jacobs et al. | 709/203 |
| 7,363,233 B1 | 4/2008 | Levine | 705/1 |
| 7,383,061 B1 | 6/2008 | Hawkins | |
| 7,392,034 B2 | 6/2008 | Westman et al. | 455/402 |
| 7,415,486 B2 | 8/2008 | Multer et al. | 709/201 |
| 7,440,746 B1 | 10/2008 | Swan | |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | |
| 7,539,697 B1 | 5/2009 | Akella et al. | |
| 7,587,398 B1 | 9/2009 | Fredricksen et al. | |
| 7,596,609 B1 | 9/2009 | Refuah et al. | |
| 7,663,652 B1 | 2/2010 | Reese | |
| 7,707,150 B2 | 4/2010 | Sundararajan et al. | |
| 7,853,664 B1 | 12/2010 | Wang et al. | |
| 8,010,095 B2 | 8/2011 | Natsuno et al. | |
| 8,073,954 B1 | 12/2011 | Tu et al. | |
| 8,224,308 B1 | 7/2012 | Gavrylyako et al. | |
| 2001/0005849 A1 | 6/2001 | Boothby et al. | |
| 2001/0014893 A1 | 8/2001 | Boothby | 707/201 |
| 2001/0028363 A1 | 10/2001 | Nomoto et al. | |
| 2001/0034737 A1 | 10/2001 | Cane et al. | |
| 2001/0044805 A1 | 11/2001 | Multer et al. | 707/201 |
| 2001/0047471 A1 | 11/2001 | Johnson | 713/1 |
| 2001/0051920 A1 | 12/2001 | Joao et al. | 705/41 |
| 2001/0056473 A1 | 12/2001 | Arneson et al. | |
| 2002/0007303 A1 | 1/2002 | Brookler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0067816 A1 | 6/2002 | Bushnell | |
| 2002/0069178 A1 * | 6/2002 | Hoffman | 705/64 |
| 2002/0072350 A1 | 6/2002 | Fukuzato | |
| 2002/0073212 A1 | 6/2002 | Sokol et al. | 709/229 |
| 2002/0078075 A1 | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0087588 A1 | 7/2002 | McBride et al. | |
| 2002/0091785 A1 | 7/2002 | Ohlenbusch et al. | 709/208 |
| 2002/0116444 A1 | 8/2002 | Chaudhri et al. | 709/201 |
| 2002/0118192 A1 | 8/2002 | Couckuyt et al. | |
| 2002/0120600 A1 | 8/2002 | Schiavone et al. | 707/1 |
| 2002/0126814 A1 | 9/2002 | Awada et al. | |
| 2002/0128908 A1 | 9/2002 | Levin et al. | 705/14 |
| 2002/0138582 A1 | 9/2002 | Chandra et al. | 709/206 |
| 2002/0152278 A1 | 10/2002 | Pontenzone et al. | |
| 2002/0162011 A1 | 10/2002 | Tanaka et al. | 713/200 |
| 2002/0168964 A1 | 11/2002 | Kraft | |
| 2003/0021274 A1 | 1/2003 | Siikaniemi et al. | |
| 2003/0028451 A1 | 2/2003 | Ananian | 705/27 |
| 2003/0037020 A1 | 2/2003 | Novak et al. | 707/1 |
| 2003/0043195 A1 | 3/2003 | Kling et al. | |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | 707/1 |
| 2003/0110280 A1 | 6/2003 | Hinchliffe et al. | |
| 2003/0158960 A1 | 8/2003 | Engberg | |
| 2003/0163483 A1 | 8/2003 | Zingher et al. | |
| 2003/0200023 A1 | 10/2003 | Matsushita et al. | |
| 2003/0204568 A1 | 10/2003 | Bhargava et al. | 709/206 |
| 2003/0217181 A1 | 11/2003 | Kiiskinen | |
| 2003/0229723 A1 | 12/2003 | Kangas et al. | |
| 2003/0229898 A1 | 12/2003 | Babu et al. | 725/87 |
| 2003/0233418 A1 | 12/2003 | Goldman | |
| 2003/0236933 A1 | 12/2003 | Shigeta et al. | |
| 2004/0003390 A1 | 1/2004 | Canter et al. | |
| 2004/0054746 A1 | 3/2004 | Shibata | 709/207 |
| 2004/0093342 A1 | 5/2004 | Arbo et al. | 707/102 |
| 2004/0093385 A1 | 5/2004 | Yamagata | 709/206 |
| 2004/0110497 A1 | 6/2004 | Little | |
| 2004/0111465 A1 | 6/2004 | Chuang et al. | 709/203 |
| 2004/0120477 A1 | 6/2004 | Nguyen et al. | |
| 2004/0132428 A1 | 7/2004 | Mulligan | 455/411 |
| 2004/0146150 A1 | 7/2004 | Barnes | |
| 2004/0148408 A1 | 7/2004 | Nadarajah | |
| 2004/0204120 A1 | 10/2004 | Jiles | |

(56) References Cited

U.S. PATENT DOCUMENTS

| | | | |
|---|---|---|---|
| 2004/0224665 A1 | 11/2004 | Kokubo | 455/411 |
| 2004/0267390 A1 | 12/2004 | Ben-Yaacov et al. | |
| 2004/0267676 A1 | 12/2004 | Feng et al. | |
| 2005/0050117 A1 | 3/2005 | Seo et al. | |
| 2005/0054354 A1 | 3/2005 | Roman et al. | |
| 2005/0086296 A1 | 4/2005 | Chi et al. | 709/203 |
| 2005/0090253 A1 | 4/2005 | Kim et al. | 455/435.1 |
| 2005/0096975 A1 | 5/2005 | Moshe | |
| 2005/0114470 A1 | 5/2005 | Bal | |
| 2005/0144200 A1 | 6/2005 | Hesselink et al. | |
| 2005/0144251 A1 | 6/2005 | Slate | |
| 2005/0191998 A1 | 9/2005 | Onyon et al. | |
| 2005/0227674 A1 | 10/2005 | Kopra et al. | |
| 2005/0233800 A1 | 10/2005 | Jones | |
| 2005/0240494 A1 | 10/2005 | Cue et al. | |
| 2005/0273632 A1 | 12/2005 | Kawakami | |
| 2005/0283741 A1 | 12/2005 | Balabanovic et al. | |
| 2006/0095397 A1 | 5/2006 | Torres et al. | |
| 2006/0148477 A1 | 7/2006 | Reilly | |
| 2006/0190626 A1 | 8/2006 | Bhogal et al. | 709/248 |
| 2006/0195474 A1 | 8/2006 | Cadiz et al. | |
| 2006/0199599 A1 | 9/2006 | Gupta et al. | |
| 2006/0212482 A1 | 9/2006 | Celik | |
| 2006/0233335 A1 | 10/2006 | Pfleging et al. | |
| 2006/0268842 A1 | 11/2006 | Takahashi et al. | |
| 2006/0277160 A1 | 12/2006 | Singh et al. | |
| 2006/0288112 A1 | 12/2006 | Soelberg et al. | |
| 2007/0005504 A1 | 1/2007 | Chen et al. | |
| 2007/0022469 A1 | 1/2007 | Cooper et al. | |
| 2007/0047533 A1 | 3/2007 | Criddle et al. | |
| 2007/0050734 A1 | 3/2007 | Busey | 715/853 |
| 2007/0127597 A1 | 6/2007 | Ammer et al. | |
| 2007/0190983 A1 | 8/2007 | Goldfarb et al. | |
| 2007/0220419 A1 | 9/2007 | Stibel et al. | |
| 2007/0226783 A1 | 9/2007 | Mimlitsch | |
| 2008/0005080 A1 | 1/2008 | Xiques et al. | |
| 2008/0009268 A1 | 1/2008 | Ramer et al. | |
| 2008/0022220 A1 | 1/2008 | Cheah | 715/769 |
| 2008/0027826 A1 | 1/2008 | Popick et al. | |
| 2008/0039020 A1 | 2/2008 | Eskin | 455/41.2 |
| 2008/0051071 A1 | 2/2008 | Vishwanathan et al. | |
| 2008/0051117 A1 | 2/2008 | Khare et al. | |
| 2008/0064378 A1 | 3/2008 | Kahan et al. | |
| 2008/0089299 A1 | 4/2008 | Lindsley et al. | |
| 2008/0104442 A1 | 5/2008 | Diao et al. | |
| 2008/0120199 A1 | 5/2008 | Pirnack et al. | |
| 2008/0208617 A1 | 8/2008 | Onyon et al. | |
| 2008/0214167 A1 | 9/2008 | Natsuno et al. | |
| 2008/0270805 A1 | 10/2008 | Kean | |
| 2009/0037828 A1 | 2/2009 | Waite et al. | |
| 2009/0138546 A1 | 5/2009 | Cruzada | |
| 2009/0327305 A1 | 12/2009 | Roberts et al. | |
| 2010/0057777 A1 | 3/2010 | Williamson | |
| 2010/0205448 A1 | 8/2010 | Tarhan et al. | |
| 2010/0251230 A1 | 9/2010 | O'Farrell et al. | |
| 2011/0107203 A1 | 5/2011 | Nash et al. | |
| 2011/0269424 A1 | 11/2011 | Multer et al. | |
| 2012/0151346 A1 | 6/2012 | McClements, IV | |

FOREIGN PATENT DOCUMENTS

| | | | |
|---|---|---|---|
| CN | 1313697 A | 2/2005 | |
| CN | 2003-122958 | 7/2006 | H04Q 7/38 |
| EP | 0801487 A2 | 10/1997 | H04L 29/06 |
| EP | 0836131 A2 | 4/1998 | G06F 1/00 |
| EP | 0836301 A | 4/1998 | H04L 12/58 |
| EP | 0924917 A2 | 6/1999 | H04M 3/42 |
| EP | 0930593 A | 7/1999 | G08B 5/22 |
| EP | 1024441 A2 | 2/2000 | G06F 17/30 |
| EP | 0986225 A1 | 3/2000 | G06F 17/30 |
| EP | 1139608 A2 | 10/2001 | H04L 12/28 |
| EP | 1180890 A2 | 2/2002 | G06F 12/00 |
| EP | 1263244 A2 | 4/2002 | H04Q 3/00 |
| FR | 1998-106683 | 12/1998 | G06F 17/30 |
| GB | 2366050 A | 6/2001 | G06F 11/34 |
| JP | 7303146 A | 11/1995 | |
| JP | 10191453 | 7/1998 | H04Q 7/38 |
| JP | 11242620 | 9/1999 | G06F 12/00 |
| JP | 11242677 | 9/1999 | G06F 12/00 |
| JP | 2000232680 A | 8/2000 | |
| JP | 2000316053 A | 11/2000 | |
| JP | 2002142254 A | 5/2002 | |
| JP | 2002185575 A | 6/2002 | |
| JP | 2002247144 A | 8/2002 | |
| JP | 2002314689 A | 10/2002 | |
| JP | 2003259011 A | 9/2003 | |
| WO | WO 97/04391 | 2/1997 | G06F 11/14 |
| WO | WO 97/39564 | 10/1997 | H04L 12/58 |
| WO | WO 97/41520 | 11/1997 | G06F 17/30 |
| WO | WO 98/03005 | 1/1998 | H04M 3/42 |
| WO | WO 98/21648 | 5/1998 | G06F 9/00 |
| WO | WO 98/29994 A | 7/1998 | H04L 12/58 |
| WO | WO 98/54662 | 12/1998 | G06F 17/30 |
| WO | WO 98/56159 A | 12/1998 | H04M 7/00 |
| WO | WO 99/05813 | 2/1999 | H04L 9/00 |
| WO | WO 99/06900 | 2/1999 | G06F 13/00 |
| WO | WO 99/36870 | 7/1999 | G06F 17/30 |
| WO | WO 99/40514 | 8/1999 | G06F 9/46 |
| WO | WO 99/45451 | 9/1999 | G06F 17/30 |
| WO | WO 99/45484 | 9/1999 | G06F 17/30 |
| WO | WO 99/46701 A | 9/1999 | G06F 17/30 |
| WO | WO 99/50761 | 10/1999 | G06F 17/30 |
| WO | WO 99/65256 | 12/1999 | H04Q 7/00 |
| WO | WO 00/11832 | 3/2000 | |
| WO | WO 00/16222 | 3/2000 | G06F 17/30 |
| WO | WO 00/29998 | 5/2000 | G06F 17/60 |
| WO | 0133874 A1 | 5/2001 | |
| WO | WO 01/71539 | 9/2001 | G06F 17/00 |
| WO | WO 01/80535 A1 | 9/2001 | H04M 1/64 |
| WO | 0217140 A2 | 2/2002 | |
| WO | 03056789 A1 | 7/2003 | |
| WO | 03-083716 A1 | 10/2003 | |
| WO | WO 2005/112586 A2 | 12/2005 | |

OTHER PUBLICATIONS

Chase, Larry, "Taking Transactions Online,"Oct. 1998, pp. 124-132, Target Marketing, v.21 No. 10.
Gong, Li, "Increasing Availability and Security of an Authentication Service," Jun. 1993, pp. 657-662, IEEE Journal on Selected Areas in Communications, v. 11 No. 5.
DeMaio, Harry B., "My MIPS are Sealed," Sep./Oct. 1993, pp. 46-51, Chief Information Officer Journal, v. 5 iss.7.
Anonymous: "Download filter for MMS", Research Disclosure, Mason Publications, Hampshire, GB, vol. 457, No. 28, May 1, 2002, XP007130322, ISSN: 0374-4353.
Intellisync Email Accelerator, A detailed guide to functionality-Product functionality paper, Mar. 2004, pp. 1-18.
Lee et al, "Monitoring Data Archives for Grid Environments," Jul. 2002, 10 pgs.
Batista et al. "Mining Web Access Logs of an On-line Newspaper" Jul. 2002, 8 pgs. http://ectrl.itc.it/rpec/.
Internet Mail Consortium: :vCard Overview, Oct. 13, 1998, 3 pages, Retrieved from the Internet: www.imc.org/pdi/vcardoverview.
Internet Mail Consortium: :vCard The Electronic Business Card, Jan. 1, 1997, 5 pages, Retrieved from the Internet: www.imc.org/pdi/vcardwhite.html.
Reed, Benjamin C., et al.,"Authenticating Network-Attached Storage,"IEEE, Jan.-Feb. 2000, pp. 49-57.
Gaskin, J.E.:Messaging-Instant Enterprise—Once a Novelty item, IM is Becoming a More Serious Tool for Business Users, InternetWeek, No. 810, Apr. 24, 2000, p. 55.
BusinessWire, "FusionOne Partners with WhitePages.com to Deliver Automatic Synchronization for Online Subscriber,"press release, Oct. 11, 2000.
Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.

(56) References Cited

OTHER PUBLICATIONS

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440-447.

Rou et al., "Online File Storage System," 2002 Student Conference on Research and Development Proceedings, Shah Alam, Malaysia, Nov. 7, 2002, IEEE, pp. 83-86.

Agarwal et al., "On the Scalability of Data Synchronization Protocols for PDAs and Mobile Devices," Jul. 2002, IEEE Network, pp. 22-28.

"Secure Hash Algorithm", Wikipedia, accessed Feb. 28, 2012, <http://en.wikipedia.org/wiki/Secure_Hash_algorithm>.

\* cited by examiner

APPARATUS AND METHOD FOR OPERATIONAL SUPPORT OF REMOTE NETWORK SYSTEMS

BACKGROUND OF THE INVENTION

1. Field of the Invention

This invention pertains generally to the remote installation, maintenance and upgrade of servers in a network system. More particularly, the invention is a hardware installation apparatus and method for upgrading as well as repairing malfunctioning servers rapidly and remotely.

2. Description of the Background Art

One of the major problems for large network systems is the maintenance, repair and upgrade of the multitude of servers associated with the network system. There is a need for insuring a certain level of uniformity in the repairs and upgrade procedures completed at different operation centers located around the globe.

The maintenance of network servers residing in different locations can be a time consuming and laborious process. Presently, technicians stationed at a local operations center must manually maintain and upgrade the particular, local servers. Maintenance of a small number of servers is achievable by local personnel, but with larger numbers of servers placed online, manual maintenance becomes problematic. The quality of the manual repairs completed at different operation centers may vary depending on the individual performing the maintenance. There is a need to obtain a certain level of quality control over the maintenance the servers within the network no matter where the server is located.

Another problem for large network systems is the finding the appropriate time and duration or time slot in which the maintenance of servers can be completed. Many network systems cannot disconnect users or disrupt the user's business by abrupt cutoffs to carry out routine maintenance of servers. In some cases maintenance can be completed at off-peak hours, or servers scheduled for maintenance can be shut down gradually to allow users to complete their sessions. Finding the time for maintenance is more problematic for network systems which operate 24 hours a day and seven days a week. Many round-the-clock network systems have applications which can repair and maintain servers remotely from the network system's central server system. These existing remote systems allow the downloading of applications from a central data base to individual servers, but unfortunately, configuration of the software for each unique server must be completed manually.

Presently, if a server of a network system goes down or otherwise malfunctions, a technician must reboot the machine and try and repair the problem as quickly as possible in order to get the server back online. Unfortunately, these quick fixes can cause problems later on for the server and the network system. The repaired server has been altered so it is no longer identical to it's backup server. Such "quick fixes" can effect the overall efficiency of the network system and trying to identify which manual repairs are responsible for the cascading of the network can be difficult.

There is a need to make the maintenance and upgrade of servers in a network system as simplistic as possible. The network industry is interested in implementing methods and procedures for the installation, repair and upgrade of servers which require minimal intervention by personnel stationed at local operation centers.

Accordingly, there is a need for a method and apparatus for hardware installation and maintenance which can be achieved remotely. The present invention satisfies these needs, as well as others, and generally overcomes the deficiencies found in the background art.

SUMMARY OF THE INVENTION

The present invention provides an apparatus and method for operational support for remote network systems. The invention also provides a method which allows for the rapid replacement of one server with another, in such instances as server malfunctions, routine maintenance or upgrades. In general terms, the method of the invention comprises providing a program storage device containing a machine identifier associated with a first, original server, transferring the program storage device and machine identifier to a second, spare server, and remotely configuring the second, spare server, according to the program storage device and machine identifier associated with the first, original server, such that the second, spare server becomes an identical replacement for the first, original server. Thus, if the first, original server malfunctions, the spare or replacement server can be remotely configured to replace the original server according to the information in the machine identifier stored on the program storage device.

The system of the invention comprises generally a network system including a central server system, a plurality of servers, a plurality of program storage devices corresponding to the plurality of servers and each including a machine identifier associated with one of the plurality of servers, and at least one backup server capable of reading the program storage devices and adopting the configuration of one of the plurality of servers according to one of the machine identifiers. Preferably, the network system comprises a plurality of operation centers or nodes, with each operation center including a plurality of servers, at least one backup server, and a corresponding plurality of program storage devices each containing a machine identifier associated with one of the plurality of servers. The central server system includes a database configured such that the spare servers can access the database and download information therefrom according to the machine identifier read from a program storage device, so that the spare server can be re-configured in the manner of the server associated with the machine identifier. In this manner, the spare server can quickly and easily replace one of the plurality of servers in the event of a malfunction.

When it is necessary to replace one of the plurality of servers for any reason, including those stated above, the program storage device may be removed from one server and placed into the blank or spare server. The program storage device allows the spare server to boot up and copy an operating system ("OS") and a "plug and serve" application to the spare server's hard drive. The OS and "plug and serve" or maintenance application may be on an external CD or may be downloaded from a remote device. The spare server is re-booted using the newly installed OS, and the "plug and serve" application writes and reconfigures the BIOS ("basic input/output system") settings, and also contacts an administration server associated with the central server system. The administration server will issue a dynamic host configuration protocol (DHCP), a temporary internet protocol (IP) which is external, to enable the spare server to connect with the central server system data base by TCP/IP. The data base will then download applications to the spare server which are appropriate for the machine identifier that the spare server now contains. Once the spare server has received the appropriate applications, the IP address is re-configured to the local non-routable IP address designated for the original server. At this point the spare server re-boots and in all aspects is an identical copy of the original server it has replaced.

The program storage devices are initially generated from the data base of the central server system and then transferred to the appropriate ones of the plurality of servers. The program storage device comprises; the servers unique machine identifier, a kernel for boot up purposes, and a small image copying application such as "Drive Image".

The machine identifier contained in the program storage device may comprise any machine readable code which identifies the machine number, and the operation center site number, area code and country code. In the preferred embodiments, the machine identifier is a 15 character alphanumeric code which is derived from the machine number (i.e. M001), site number (i.e. S02) of the operations center where the machine resides, the area code (i.e. A408) of the operation center followed by the country code (i.e. C001). Thus, an example of a 15 character machine identifier containing a machine number, site number, area code and country code is M001S02A408C001.

This machine identifier allows the backup or spare server to be recognized by the data base coupled to or integrated within the network's central server system. Once the information stored on the program storage device has been copied onto a spare sever machine, the spare machine will contact the central server data base and receive the appropriate downloads necessary to allow the spare server to run the tasks carried out by the original server machine.

The replacement server and the original server generally must have the same hardware configuration for the implementation of the present invention. Machines purchased from the same vendor may have identical hardware but the BIOS may be slightly different. The BIOS for each machine is pre-configured by the data base, according to the specific machine identifier. By writing over the factory-installed BIOS, the BIOS of each server within the network can be standardized.

The present invention allows for the remote maintenance of servers. The servers are capable of receiving simple messages through SMNP ("signal management network protocol") from the central server system data base. The SMNP messages indicate that the server should be shut down or turned on. Personnel have access to a web page associated with the network operation support organization which enable the personnel to remotely shut down or start up the servers. Generally, the modes of operation which can be initiated by personnel from the website are turning a server on, immediately shutting down a server, or slowly shutting down a server.

For many network organizations it is very important to be able to slowly shut down a server so as not to leave users disconnected. In these situations, the server is requested not to allow any new users to log on, and soon no users will be utilizing that particular server. The machines program storage device can then placed into a spare server and following the method of the present invention, the new server will replace to the server that has been scheduled for maintenance. The server that has been taken offline can be shipped to a the main service shop of the network organization for repairs or can be cleansed and utilized as an extra spare server. This method allows for staggered re-boots of multiple servers in a organized and timely manner via the web site.

The present invention is capable of setting parameters for shutdowns related to server upgrades and initiate these upgrades remotely. The optimal procedure for the upgrade of severs is to shut down specific servers at a particular time and for a specific duration to insure minimal interruption to users of the system. A similar method used in the shutdown of servers for repair and maintenance via a web page is applied to server upgrades. In this instance, the machine identifier can be accessed by administration personnel via a administration server associated with the central server system, with a request that the server to be shutdown either immediately or slowly for upgrades. Once the server is shut down, the data base can transmit the appropriate upgrades for the that particular servers machine identifier.

Another aspect of the invention is to provide a service which protects the server BIOS from unwanted changes to the pre-configured settings determined by the central server system data base. The "plug and play" (PS) application takes an image of the BIOS and stores it on the hard drive of the server. The PS application can detect when the BIOS has been tampered with and during the next boot up will remove the changed BIOS and revert back to the BIOS configuration specific for that machine ID. The invention allows for no contamination by immediate fixes.

An object of the invention is to provide an efficient and cost effective method for installing and maintaining network servers remotely.

Another object of the invention is to provide network server upgrades remotely.

Another object of the invention is to provide service monitoring through SNMP (signaling network management protocol) to allow a server to receive messages from the data base of the central server system.

Another object of the invention is providing a method which remotely defines and implements the parameters and events associated with server shutdowns.

Another object of the invention is to provide a method which allows for quick recovery from unexpected server crashes.

Another object of the invention is providing security measures to prevent unintentional changes of a server's BIOS settings. This service provided by the invention is associated with the "plug and server" application residing on the local machine.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
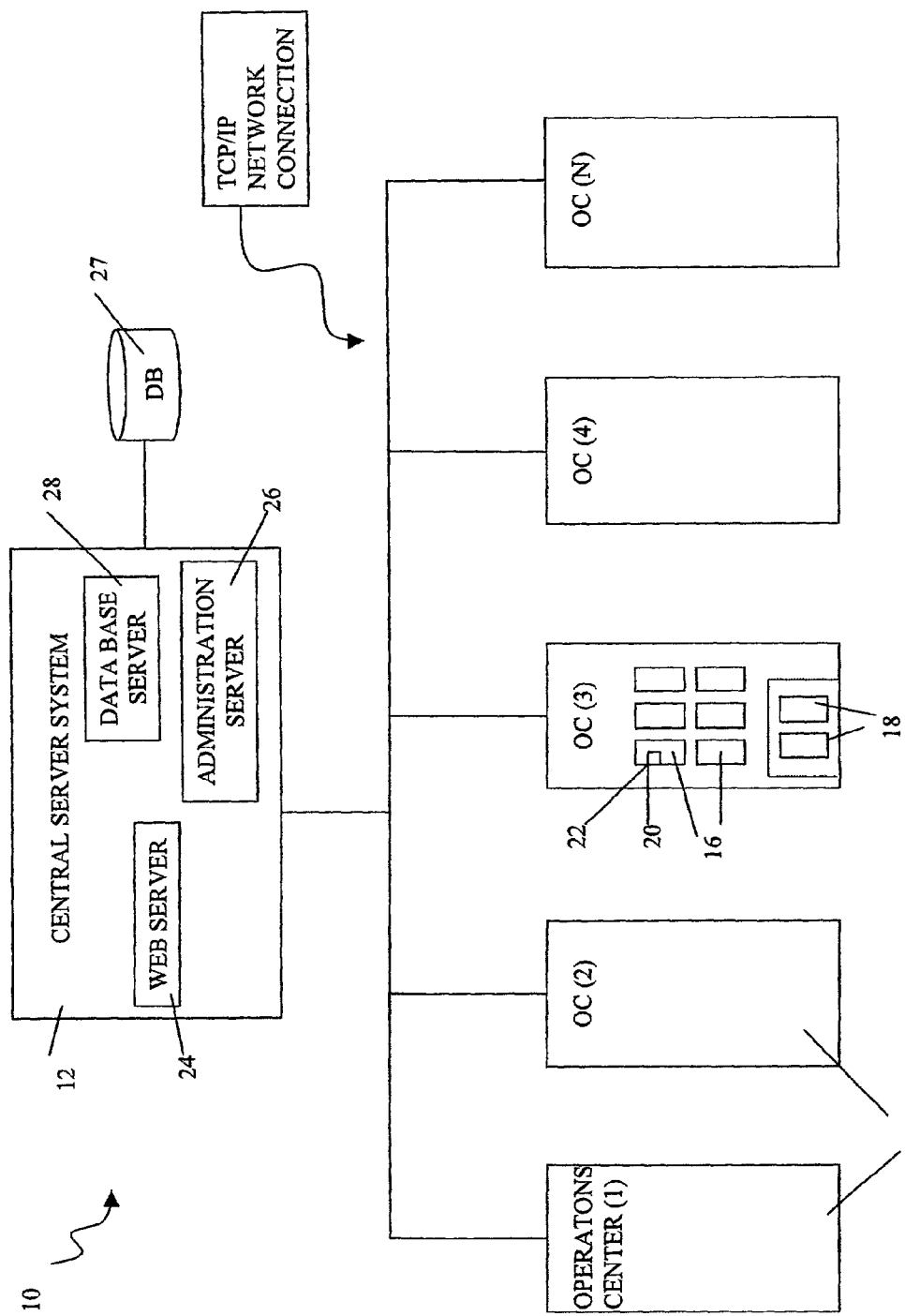
FIG. 1. is a schematic diagram of a network system in accordance with the present invention.
Figure 2:
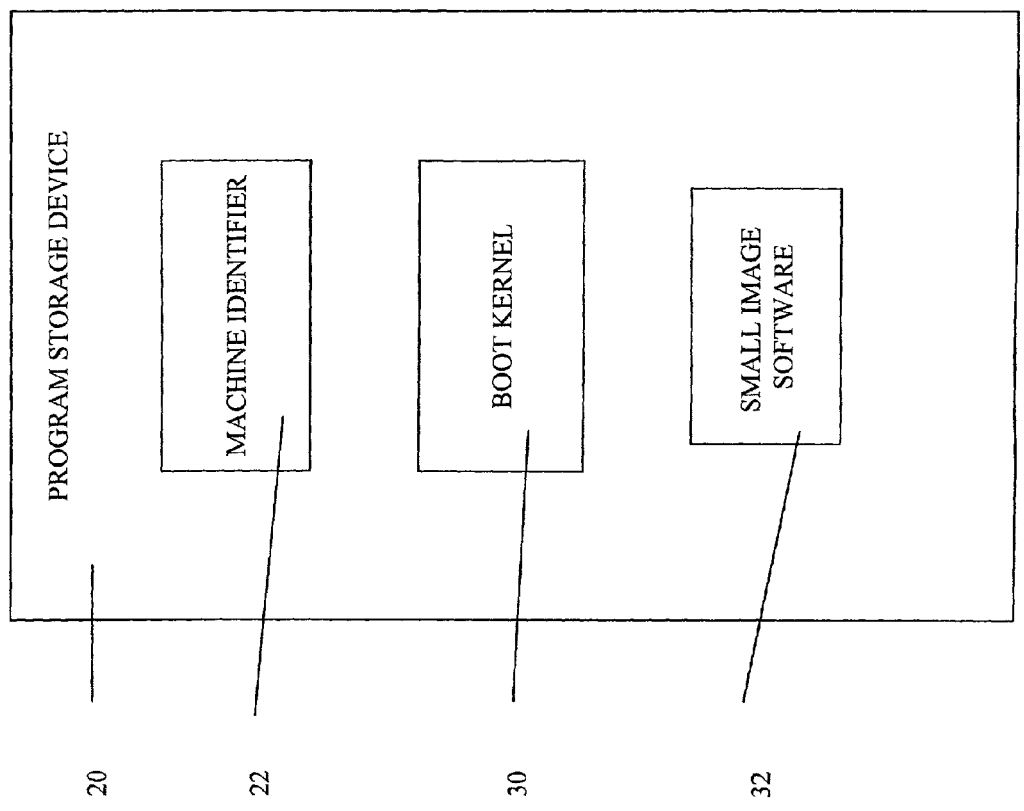
FIG. 2. is a schematic diagram of a program storage device in accordance with the present invention.
Figure 3:
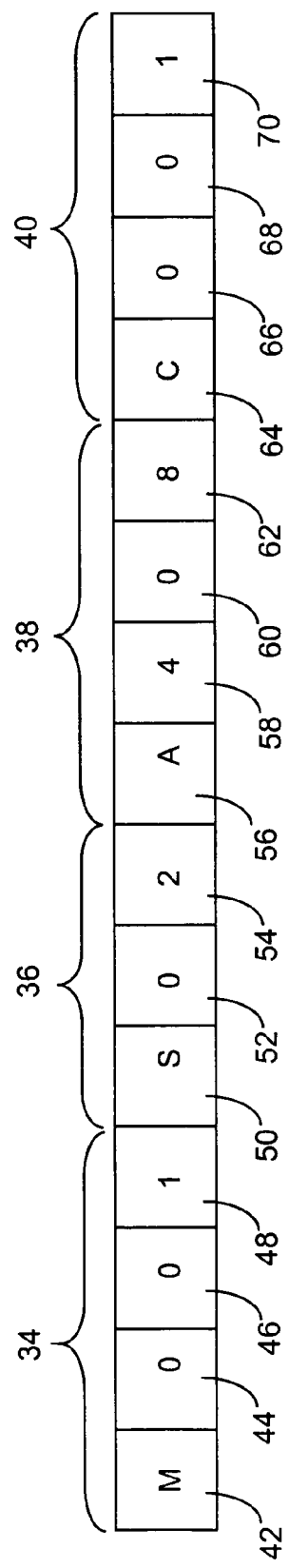
FIG. 3. is an exemplary format structure for a machine identifier in accordance with the present invention.
Figure 4:
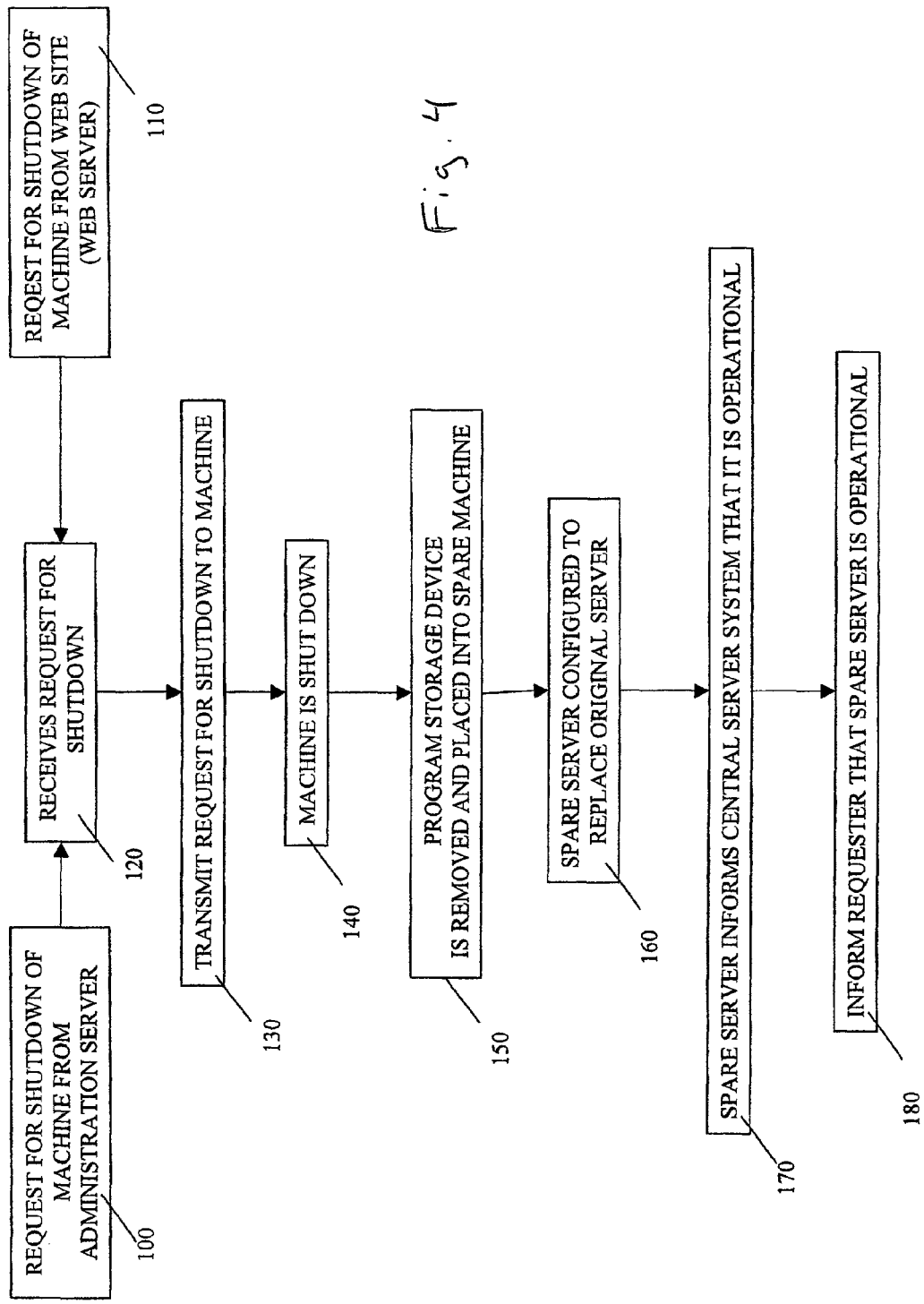
FIG. 4. is a flowchart generally showing the acts and events associated with the remote upgrade and maintenance method of the present invention.
Figure 5:
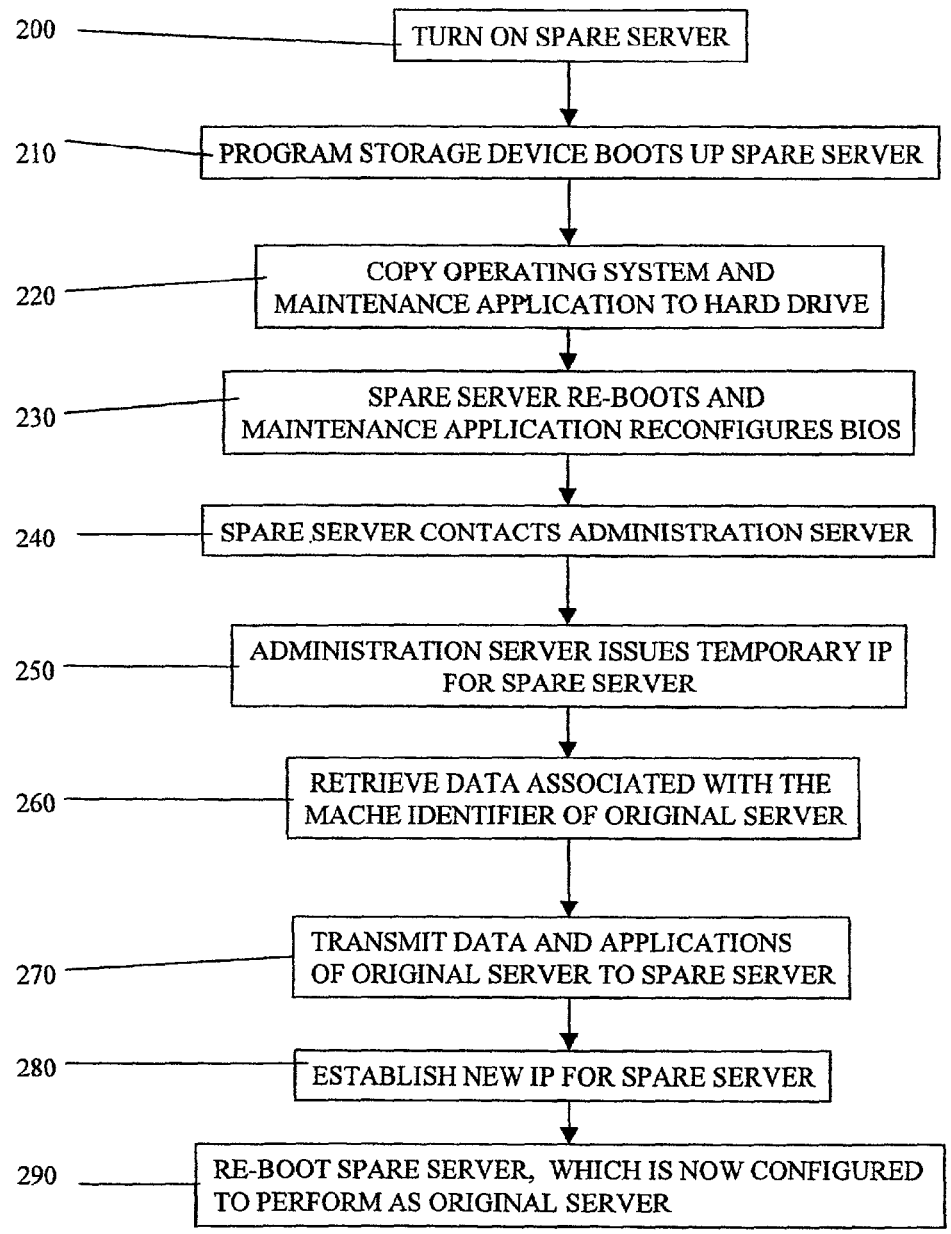
FIG. 5 is a flow chart showing generally the acts and events associated with the replacement or swap-out of a server in accordance with the present invention.

Referring more specifically to the drawings, for illustrative purposes the present invention is embodied in the apparatus shown generally in FIG. 1 and FIG. 2 and the method outlined generally in FIG. 3 through FIG. 5. It will be appreciated that the apparatus may vary as to configuration and as to details of the parts, and that the method may vary as to details and the order of the steps, without departing from the basic concepts as disclosed herein. The invention is disclosed generally in terms of an apparatus and method for operational support of remote network systems. It should be readily understood, however, that the invention may be used for a variety of types of server maintenance and installation procedures for network systems. Other operational support uses for the invention will suggest themselves to those skilled in the art, and are considered to be within the scope of this disclosure.

Referring first to FIG. 1, there is shown generally a remote operational support network system 10 in accordance with the invention. Generally, the remote operational support system 10 includes a central server system 12 which is operatively coupled with a plurality of operation centers 14 via a conventional TCP/IP network connection. Each operation center 14 includes a plurality of servers 16 operatively connected to the central server system 12. Each operation center 14 further includes a plurality of spare servers 18. Each server 16 includes a program storage device 20 that contains a machine identifier code 22 which can be recognized by the central server system 12.

Central server system 12 is shown as including a web server 24, an administration server 26 and a data base 27, which are used in carrying out remote operational support of the network system 10. Preferably, the central server system also includes a database server 28 which retrieves data from data base 27 upon requests from system 10. The central server system 12 may consist of one or more additional servers (not shown) such as, for example, an account creation server, a server associated with a modem pool, a computer user server, a machine identifier server, and a mobile telephone user server. Such server system configurations are well known in the art. An exemplary multiple server configuration of this type suitable for use with the present invention is disclosed in detail in co-pending U.S. patent application Ser. No. 09/618,954 entitled "METHOD AND APPARATUS FOR A SECURE REMOTE ACCESS SYSTEM", the disclosure of which is incorporated herein by reference. Such a multiple server configuration would allow for the handling of certain discreet operations by different servers and is preferred in some embodiments of the invention.

The servers 16 and 18 included in the operation centers 14, as well as other servers associated with the central server system 12, may comprise any standard data processing means, including minicomputer, microcomputer, UNIX®, mainframe, personal computer (PC) or clone thereof, an APPLE® computer or clone thereof, a SUN® work station or server, or other appropriate computer. The hardware components of server 16 and spare server 18 are identical, and may include conventional hardware components (not shown) such as a motherboard, central processing unit (CPU), random access memory (RAM), hard disk drive, display adapter, other storage media, a monitor, keyboard, mouse or other user input/output means, a network interface card (NIC), and/or other conventional input/output devices.

Network server 16 generally has loaded in its RAM conventional operating system software (not shown), such as UNIX®, Linux™, Windows NT®, Novell®, Solaris® or other server operating system. Network server 16 may further have loaded in its RAM conventional web server software (not shown) for handling http (hyper text transfer protocol) or web page requests from remote users. Server 16 or data base server (not shown) in central server system 12 will also generally have loaded in its RAM conventional database software (not shown) such as Oracle®, IBM® DB2, Microsoft SQL® or other appropriate database software for storage, update and retrieval of server identification data associated with database 27. In accordance with the invention, servers 16 further include a program storage device 20, as noted above, which may be in the form of a floppy disk, or other such software storage device which can be transferred from server 16 to a spare server 18.

Referring now to FIG. 2, as well as FIG. 1, there is shown a program storage device 20 in accordance with the present invention. Each program storage device 20 preferably comprises a particular server's 16 unique machine identifier or ID 22, a kernel 30 for boot up purposes, and a small image application 32 such as a "Drive Image". When it is necessary to replace a server 16 for any reason, such as performing upgrades or maintenance, the program storage device 20 may be removed from server 16 and placed into a blank or spare server 18. The program storage device allows the spare server 18 to be re-configured such that it is identical to the original server 16, so that spare server 18 can replace the original server 16 while the original server undergoes maintenance or upgrading.

The program storage device 20 allows a backup server 18 to be re-configured as a replacement for a server 16. The boot kernel 30 included in the program storage device 20 allows for spare server 18 to boot up when it is turned on. The small image software 32 allows an image of an operating system ("OS") and a maintenance application (not shown) to be copied to the hard drive of spare server 18. The OS and maintenance application may be copied from an external CD (computer disk) (not shown), or may be downloaded from the central server system 12. The spare server 18 is re-booted using the newly installed OS, and the maintenance application writes and reconfigures the BIOS (basic input/output system) settings of the spare server 18, and the maintenance application, which is now on the hard drive of spare server 18, contacts the administration server 26 associated with the central server system 12.

Upon contacting by the maintenance application, the administration server 26 issues a DHCP (dynamic host configuration protocol), and a temporary internet protocol (IP) which is external, to enable the spare server 18 to receive information from data base 27 by TCP/IP. The central server system 12 will then download, from data base 27 to the spare server 18, one or more applications which are appropriate for the machine identifier 22 that the spare server 18 now contains. In other words, the central server 12 provides the applications to spare server 18 required for spare server 18 to replace server 16, and spare server 18 is fully operational as a replacement for server 16. Once the spare server 18 has received the appropriate applications, the IP address for spare server 18 is re-configured to the local non-routable IP address designated for the original server 16. The spare server 18 is then re-booted and, at this point, is in all aspects an identical copy of the original server it has replaced. Maintenance or upgrade operations for server 16 may be carried out without inconvenience to network customers, since spare server 18 acts as an identical replacement for original server 16.

In operation, maintenance and upgrades can be initiated remotely via a web page (not shown), associated with the web server 24 of central server system 12. A request can be made by personnel from the web page to shut down a particular, selected server 16 which corresponds to a specific machine identifier 22. The web server 24 transmits the machine identifier 22 code for the selected server 16 to the data base server 28, which then retrieves data from data base 27 regarding the location of server 16 within the network system 10. The request for shutdown is operatively communicated to server 16 by central server system 12, and shut down of server 16 is initiated. Shut down of server 16 is carried out slowly, and traffic associated with the server 16 being shut down is directed to the other servers of operation center 14 to avoid interruption of customer service. Once server 16 has been shut down, the program storage device 20 corresponding to server 16 is placed or loaded into a spare server 18, and spare server 18 is configured to match or replace server 16, to produce an identical backup machine for server 16. Spare server 18 is started up and placed on line, and the server 18 communicates to central server system 12 that it is on line and operational. Information regarding location and operation of the replacement server 18 preferably is stored in data base 27, to allow remote shut down of server 18 at a future time. The requester for the shut down of server 16 is informed that the replacement server 18 is operational, and customer traffic is redirected to back up server 18, while repairs or upgrades are performed on server 16.

Maintenance and/or upgrades for network servers 16 can also be initiated by requests to the administration server 26 in accordance to the invention. The requests can be made by administration personnel to shutdown or turn-on servers 16 by specifying the appropriate machine identifiers 22 via the administration server 26. The data base server 28 retrieves data on the specified machine identifiers 22 from data base 27, thus allowing the servers 16 to be contacted by the central server system 12 and requested to shutdown. During shut down, traffic associated with server 16 is re-routed through other servers in the operation center 14 to avoid service interruption, as noted above. The program storage device 20 corresponding to server 16 is then loaded into spare server 18, spare server 18 is configured to match or replace server 16, and spare server 18 is brought on line as related above.

Maintenance or upgrading of server 16 as described above may be carried out upon notice by personnel of a malfunction by server 16, or according to a predetermined maintenance or upgrade schedule. In the event that a server 16 "crashes" or catastrophically malfunctions, a back up server 18 may be brought into service to replace server 16 in the same manner as described above, although the crash will result in interruption of customer service.

Referring now to FIG. 3, there is shown one preferred format structure for a machine identifier 22 for a server 16, in accordance with the invention. The machine identifier 22 will generally include a plurality of fields 34, 36, 38, 40, each of which contains one or more cells having a value or symbol therein as described below. The number of fields and cells may vary as required for different implementations of the invention, and it should be understood that the format structure of FIG. 3 is only exemplary. Thus, the number of fields, as well of the number of cells in each field, may vary in different embodiments of the invention.

In the presently preferred embodiments, the machine identifier 22 will comprise fifteen digits or values which collectively represent an alphanumeric code for a server 16 in the network system 10. The field 34 will generally identify a number or code specific for a type of server machine. Thus, the first (left most) cell 42 in field 34 includes an "M" symbol to identify the field 34 as a code for a machine type. Cell 44 includes a value representative of a server class type, while cells 46 and 48 provide values which relate a specific machine number. Cell 50 includes an "S" symbol to indicate that field 36 relates a code for a site location (corresponding to the location of an operation center 14), and cells 52, 54 include values which identify the particular site location. Cell 56 includes an "A" symbol to identify that field 38 identifies a telephone area code corresponding to the site location for an operation center 14, and cells 58, 60, 62 include values representing the area code. Cell 64 includes a symbol "C" to indicate that field 40 is a country code, and cells 66, 68, 70 include values representing a country code corresponding to the country in which an operation center 14 is located.

Thus, in the specific example of FIG. 3, the values of machine identifier 22 provide "M001SO2A408C001" as a fifteen digit alphanumeric code which identifies the type or class of server 16, the number of a particular server machine 16 in an operation center 14, the site location of the operation center 14, and the telephone area code and country code for the operation center 14. In this manner, the machine identifier can be specific for a single server device 16 in a large network system 10 spanning multiple countries. The machine identifier 22 thus provides a method of naming servers 16 within a network system 10 which is very straightforward in comparison to the IP assignment convention or the domain name server (DNS) naming convention used at present. Once again, the machine identifier 22 of the invention may vary. For example, in network systems 10 located in a single country, the country code field 40 may be omitted, or the cells therein may be used to encode different information.

Referring now to FIG. 4, as well as FIG. 1 through FIG. 3, the acts and events associated with the remote upgrade and maintenance method of the present invention will be more fully understood. The events shown in FIG. 4 may be initiated by event 100 or event 110.

In event 100, a request for shut down of a specific server machine 16, for upgrade or maintenance purposes, is made by the administration server 26 pursuant to an instruction from personnel as described above. The request is made by administration personnel, or according to predetermined scheduling, to shutdown server 16, for upgrade purposes, by specifying the appropriate machine identifier 22 via the administration server 26.

In event 110, which may occur alternatively to event 100, a shut down request for a specific server machine 16 is made from web server 24 for upgrade or maintenance purposes. As described above, a web page (not shown) is associated with the web server 24 of central server system 12, and a request is made by personnel, via the web page to shut down a particular, selected server 16 which corresponds to a specific machine identifier 22.

At event 120, database server 28 receives a request for information associated with shut down of a particular server 16. Event 120 may be responsive to a request from the administration server 24 in event 100 or web server 24 in event 110 as noted above. In event 120, data base server 28 retrieves data from data base 27 regarding the location of server 16 within the network system 10.

At event 130, a shut down request is transmitted or communicated by the central server system 12, via machine identifier server 29, to server 16 which is to be shut down.

At event 140, server 16 is shut down. As noted above, shut down of server 16 is carried out slowly, and traffic associated with server 16 is directed to the other servers in the operation center 14, to avoid interruption of customer service.

At event 150, the program storage device 20 corresponding to server 16 is removed from server 16 and is placed or loaded into a spare server 18.

At event 160, spare server 18 is configured to match or replace server 16, in order to produce an identical backup machine for server 16, and the spare server 18 is brought on line. The details of event 160 are described further below with reference to FIG. 5.

At event 170, the replacement server 18, which is fully operational with the machine identifier 22 of the replaced server 16, communicates with central server system 12 and informs central server system 12 that spare server 18 is in operation. Information regarding the location and operation of spare server 18 is stored in data base 27.

At event 180, the central server informs the entity that requested shut down of server 16 that the replacement server 18 is operational. As noted above, the requesting entity may be the web server 24 or administration server 26.

Referring now to FIG. 5, as well as FIG. 1 through FIG. 4, the events associated with the re-configuration of spare server 18 to produce an identical backup machine for server 16 are shown. As noted above, the events shown in FIG. 5 occur generally during event 160 of FIG. 4.

At event 200, the spare server 18, which now contains the program storage device 20 is turned on or otherwise powered up.

At event 210, the spare server 18 is booted up. This event is generally carried out using the boot kernel 30, which is included in the program storage device 20.

At event 220, the operating system and maintenance application associated with the original server 16 are copied to the hard drive of the spare server 18. This event is generally carried out using the small image software 32 included in the program storage device 20. The operating system and maintenance application may be copied from a CD which is manually loaded into spare server 18, or may be downloaded from data base 27 to spare server 18, as related above.

At event 230, the spare server 18 is re-booted using the newly installed operating system and maintenance application which were copied to the spare server 18 in event 220. In this event, the maintenance application writes and reconfigures the BIOS settings of the spare server 18 to that of the original server 16.

At event 240, the administration server 26 is contacted by the spare server 18, which now has the maintenance application loaded on its hard drive.

At event 250, the administration server 26 issues temporary internet protocol and DHCP for the spare server 18, to allow the spare server 18 to receive information from data base 27.

At event 260, data and applications associated with the machine identifier 22 of the original server 16 are retrieved from data base 27 by the data base server 28.

At event 270, the data and applications related to original server 16, which were obtained in event 260, are transmitted or downloaded to the spare server 18.

At event 280, a new internet protocol or IP for the spare server is established. Generally, the IP address for spare server 18 is re-configured to the local non-routable IP address designated for the original server 16.

At event 290, the spare server 18 is re-booted. At this point the spare server 18 is, in all aspects, an identical copy of the original server 16 which it has replaced. Maintenance or upgrade operations for server 16 may be carried out while spare server 18 operates as its replacement, thereby avoiding without inconvenience to customers.

Accordingly, it will be seen that this invention provides an apparatus and method for operational support for remote network systems which allows for the rapid replacement of one server with another, in such instances as server malfunctions, routine maintenance or upgrades. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method of remotely configuring a spare server in a network system comprising a data base of server configuration information, the method comprising:

copying an operating system and a maintenance application to said spare server;

after a failure of a first server in the network system, transferring a program storage device to the spare server, the program storage device containing a boot kernel and a unique machine identifier identifying the failed first server;

after transferring the program storage to the spare server, booting the spare server from the program storage device; and after booting the spare server, the spare server configuring itself to be a functionally identical replacement for the failed first server by receiving configuration information from the data base of server configuration information according to the unique machine identifier of the first server, thereby replacing the failed first server with the configured spare server.

2. The method of claim 1 wherein said remotely configuring further comprises sending said machine identifier, by said maintenance application, to the data base associated with a central server system, said central server system operatively coupled to said first server and said spare server.

3. The method of claim 2, wherein said remotely configuring further comprises transmitting at least one application, by said central server system, to said spare server according to said machine identifier.

4. The method of claim 1, wherein said remotely configuring comprises maintaining, by said maintenance application, correct BIOS settings of said first server and said spare server according to said machine identifier.

5. The method of claim 1, further comprising providing a web server operatively coupled to said first server and said spare server, said web server including a web site configured for remote turn-on and shutdown of said first server and said spare server according to requests associated with said machine identifier.

6. The method of claim 1, further comprising providing a central server system operatively coupled to said first server and said spare server, said central server system including an administration server configured for remote turn-on and shutdown of said first server and said spare server according to requests associated with said machine identifier.

7. The method of claim 1, wherein said remotely configuring further comprises providing a central server system operatively coupled to said first server and said spare server, said central server system including the data base, said central server system configured to recognize said machine identifier according to said data base.

8. The method of claim 7, wherein said remotely configuring further comprises transmitting at least one application from said central server system data base to said spare server according to said machine identifier.

9. The method of claim 1 wherein value of said unique machine identifier is static, and wherein said unique machine identifier remains associated with the first server regardless of a physical location of said program storage device.

10. The method of claim 1, wherein the administration server enables the spare server to connect with the central server system data base.

11. The method of claim 1, wherein the data base downloads applications to the spare server according to the unique machine identifier associated with the first server and the program storage device.

12. A system for remotely configuring a functionally identical replacement for a specific server in a network, comprising:
- a plurality of servers coupled with a central server system in the network, each server of the plurality of servers having a unique machine identifier identify the server;
- a data base of server configuration information coupled with the central server system in the network comprising server configuration information for each server of the plurality of servers, wherein the configuration formation for each server is associated with the unique machine identifier identifying the server;
- a backup server coupled to the network having a copy of an operating system and a maintenance application;
- a plurality of program storage devices corresponding to said plurality of servers, each said program storage device including a boot kernel configured to boot up said at least one backup server after a failure of the specific server and a unique machine identifier identifying the specific server to be replaced of said plurality of servers; and
- the at least one backup server is configured to receive and to read said program storage devices and is further configured to adopt a configuration of the specific server to be replaced, after the specific server fails and after the at least one backup server is booted from the program storage device having the machine identifier corresponding to the specific server to be replaced, wherein the machine identifier remains associated with the specific server to be replaced until the at least one backup server adopts the configuration of the specific server such that the at least one backup server becomes a functionally identical replacement for said specific server to be replaced.

13. The system of claim 12 wherein said central server system further comprises:
- a web server;
- an administration server;
- a data base server comprising the data base; and
- the data base including data associated with said plurality of servers, said data base server configured to retrieve data from said data base according to instructions from said central server system and the unique machine identifier.

14. The system of claim 12 wherein said program storage device further comprises a small image software program configured to copy an operating system and a maintenance application to a hard drive of said backup server.

15. The system of claim 14 wherein said maintenance application is configured to utilize said machine identifier to retrieve at least one application from a data base associated with said central server system, said at least one application associated with one of said plurality of servers.

16. A system for remote support of a network, comprising:
- a plurality of servers including a first server to be replaced having a first configuration associated with a unique machine identifier and a separate backup server capable of being configured to the first configuration after the first server fails, the backup server having a copy of an operating system and a maintenance application;
- a plurality of program storage devices corresponding to said plurality of servers; and
- a program storage device including a boot kernel configured to boot up the separate backup server after a failure of the first server, and a unique machine identifier that identifies the first configuration of the first server to be replaced by the separate backup server,
- wherein the program storage device is configured to be transferred to, and boot up, the backup server after a failure of the first server, and the machine identifier enables the backup server to be configured to the first configuration wherein the backup server can be configured remotely after receiving the program storage device, such that the backup server becomes a functionally identical replacement for the first server.

17. The system of claim 16 further comprising a central server system, the central server system includes:
- a web server;
- an administration server;
- a data base server; and
- a data base including data associated with said plurality of servers by the unique machine identifier included in said program storage device.

18. The system of claim 16 wherein said program storage device further comprises a small image software program configured to copy an operating system and a maintenance application to a hard drive of said backup server.

19. A system for remote support of a network, comprising:
- a central server system comprising a database of server configurations each accessible by a unique machine identifier;
- a plurality of servers coupled with said central server system, the plurality of servers including a first server having a first configuration associated with a unique machine identifier and a configurable backup server having a copy of an operating system and a maintenance application;
- a plurality of program storage devices corresponding to said plurality of servers; and
- a program storage device, configured to be transferred to the backup server after a failure of the first server, the program storage device including a boot kernel configured to boot up the backup server after the failure of the first server, such that the backup server is then identified by the unique machine identifier associated with the first configuration, and a software application program configured to receive configuration information from the database of server configurations and to configure the backup server to the first configuration, after backup server is booted from the program storage device, according to the server configuration information associated with the unique machine identifier wherein said backup server can be configured remotely after receiving, and being booted up from, the program storage device.

20. The system of claim 19 wherein said program storage device further comprises a small image software program configured to copy an operating system and a maintenance application to a hard drive of said backup server.

21. The system of claim 20 wherein said maintenance application is configured to utilize said machine identifier to retrieve at least one application from a data base coupled to said central server system, said at least one application associated with the first server by the machine identifier.

* * * * *

UNITED STATES PATENT AND TRADEMARK OFFICE
CERTIFICATE OF CORRECTION

PATENT NO. : 8,615,566 B1
APPLICATION NO. : 09/822810
DATED : December 24, 2013
INVENTOR(S) : Edgar Allan Tu and Eric Pang It is certified that error appears in the above-identified patent and that said Letters Patent is hereby corrected as shown below:

In the Claims

Column 12, line 50, Claim 19, insert the word --the-- between "after" and "backup".

Signed and Sealed this
Twenty-fifth Day of February, 2014

Michelle K. Lee
*Deputy Director of the United States Patent and Trademark Office*